March 13, 1956     H. KOEHL     2,737,843
RESILIENT COILED SHEET METAL FASTENING PIN
Filed Feb. 1, 1952
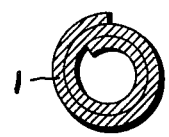
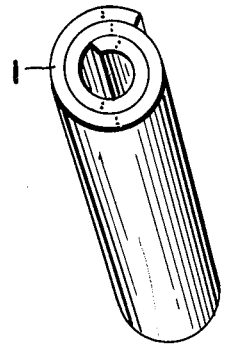
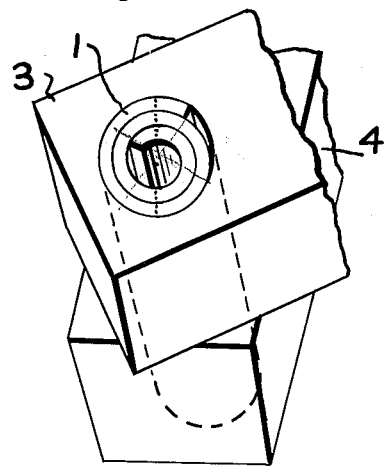
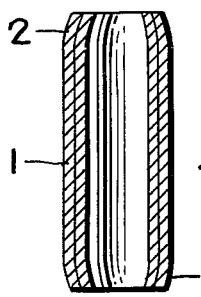
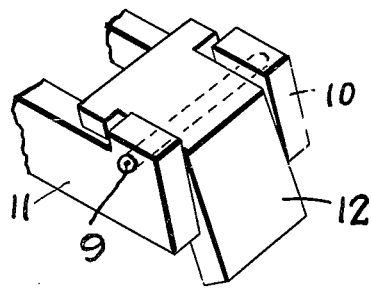
*INVENTOR.*
HERMAN KOEHL
BY
Connolly and Hutz
HIS ATTORNEYS

# United States Patent Office 2,737,843
Patented Mar. 13, 1956

2,737,843

RESILIENT COILED SHEET METAL FASTENING PIN

Herman Koehl, Danielson, Conn., assignor to C. E. M. Company, Danielson, Conn., a partnership Application February 1, 1952, Serial No. 269,521

4 Claims. (Cl. 85—5)

My present invention relates to a resilient coiled sheet metal fastening pin that may be used for connecting various mechanical or structural elements. More particularly, it concerns such a pin of high mechanical strength (when considering the kind and amount of material involved) that is composed of several turns of a convolutely wound sheet of spring material.

This application is a continuation-in-part of my copending application Serial No. 205,496, filed January 11, 1951.

In order to attach gear wheels, cams, fly-wheels, hand wheels and the like to shafts, one has generally employed solid cylindrical or conical pins. Usually these pins are hardened and ground and produced with very exact tolerances. The insertion of such pins is very cumbersome and expensive, since the previously drilled hole in the members to be fastened must be ground to an exact fit with the aid of a reamer. This operation is difficult and in most cases must be done by hand. Furthermore, the pins must be driven in firmly whereby inner tensions arise at the point of attachment, which may result in bending of the shaft and an eccentric mounting of the members attached thereto.

One has also employed solid pins having axial grooves. When driving in such pins the raised material on both sides of the grooves is forced back into the grooves and thereby the same undesirable inner tensions arise, that have been previously described. Finally, fastening pins are known which have the form of a hollow cylinder or tube and which have a slit running in axial direction. Such pins have the disadvantage that they can transfer only small turning forces owing to their limited shearing strength.

The main object of my invention is to provide an inherently elastic or flexible (hereinafter often called "resilient") form of fastening pin that is free from the foregoing drawbacks and which possesses high mechanical strength, particularly resistance to shear forces, shock and vibration. A further object is to provide such a pin which will not work loose, but which can readily be removed from the elements fastened thereby and reused. These objects are accomplished by constructing my novel fastening pin of a convolutely wound sheet of spring material having substantially uniform thickness. It possesses a spiral-shaped cross section, and at least about two complete adjacent turns of the outer winding are in substantial contact with one another. Generally, the interior diameter of my fastening pin is left free for several thicknesses of the sheet, preferably at least four such thicknesses, to produce a tubular effect, but for some purposes it may be desired to include one or more loose inner turns substantially filling the center portion of the winding. Ample free space must, however, be provided to permit contraction of the spiral cross section of the pin by a relative sliding movement of the substantially contacting turns.

The spring material of which my fastening pins are composed is generally a metal such as high carbon steel, spring brass and other resilient copper alloys. The metals used should possess a high degree of resilience (spring action) as well as sufficient hardness to resist deformation. Obviously, a brittle metal or a soft metal, such as lead foil or sheet iron, will not be suitable. For some applications, particularly the small pins to be used in the delicate instrument or optical fields, the spring material may be something other than metal. For example, some plastic materials, impregnated paper and the like can be formed into sheets of sufficient hardness and resilience to permit their use where the shear loads are not excessive. The thickness of the sheet employed may vary widely according to the required characteristics of the pin and the particular spring material employed. The edges of the sheet are preferably cut substantially at right angles to its surfaces.

By reason of their inherent elasticity and resilience my novel fastening pins possess numerous advantages, while retaining a high degree of mechanical strength. They eliminate the necessity of precise machining of the holes into which they are to be inserted. They can be driven into roughly bored holes that need not even be exactly cylindrical. When driven into a hole of slightly smaller diameter, my fastening pins will accommodate themselves and hold firmly due to their inherent resilience, without deforming the material or imparting any undesirable internal tensions to the system. They can be removed readily and used repeatedly. A particular advantage resides in their ability to absorb thrusts, vibrations and other shocks to which they may be subjected.

While my fastening pins are primarily intended for fastening mechanical elements, such as gears and shafts, they may also be used for fastening structural elements and items of hardware such as glass knobs, plastic handles, etc. The flexibility of the coils can be controlled so that the pin inserts easily without damaging fragile materials yet exerts sufficient expansion pressure to hold it firmly in the hole. Loose turns may be provided in the interior into which a peg, nail or the like may be driven and held in the center of the spiral or between the individual turns.

Having generally described my invention, I shall now describe some preferred embodiments in detail with reference to the accompanying drawings wherein they are illustrated. It is, of course, to be understood that my invention is not limited to these specific embodiments. In the drawings:

Fig. 1 shows a cross section and Fig. 2, a longitudinal section through a typical fastening pin according to my invention.

Figs. 3 and 4 are perspective views illustrating the principle of operation of my fastening pins.

Finally Fig. 5 illustrates in perspective an application wherein my pin is used as a pivot.

Referring particularly to Figs. 1 and 2, these show a common form of my fastening pin composed of slightly more than two turns 1 of a convolutely wound sheet of spring metal, such as high carbon steel. Adjacent turns are in contact with one another or substantially so. By "substantially" I mean that these turns will come into contact, when the pin is in use, so that each turn contributes materially to the shear resistance of the pin. The ends 2 of the pin are somewhat tapered to facilitate insertion thereof.

In Figs. 3 and 4 there is illustrated the principle of operation of my fastening pins. The action of these pins may be seen by comparing the positions of the dotted lines in Fig. 3 with their positions in Fig. 4 which shows the pin used to fasten the elements 3 and 4. As will be seen, the spiral is contracted to such an extent that the dotted lines have become joined end to end, whereby the spring action of the wound sheet exerts substantial expansion pressure against the sides of the hole.

Referring particularly to Figs. 1, 3, 4 and 5, it will be noted that the outer end of the outer turn of sheet 1 is essentially a radial surface, that is, there is no tapering or bevelling of the sheet. As will be seen in Fig. 4, the outer surface of the outer turn of sheet 1 is in intimate and compressive contact with the wall of the hole in element 3 throughout the first three quadrants taken counterclockwise from the free end in the outer turn of sheet 1. However, it will be noted in the fourth quadrant that the outer surface of the outer turn becomes progressively separated in space from the wall of the hole and an increasingly wide space is formed in which the turns of the pin may move and breathe when the pin is subjected to a shearing or other forces.

Such breather space constitutes a most important feature of my invention and is largely responsible for the outstanding shear strength and shock resistance of my novel fastening pins. It clearly distinguishes them from the convolutely wound shafts or axles with bevelled edges shown in the French Patent No. 744,131 of Hans Hoffmann. In these known members the entire outer surface of the outer turn is in intimate and compressive contact with the wall of the hole, and the metal in the turns must absorb the forces applied against the member by compression, until the metal suffers from fatigue and cracks and splits as the metal tries to shorten itself as the form of the turns change from an arc of a circle to a chord in a circle. On the other hand, with a breather space as provided in the pins of my invention, the turns in the fourth quadrant are free to flex under stress and their form is free to change from a chord to a shorter chord as the outer surface of the outer turn follows more and more the wall of the hole in element 3.

A common use of my locking pins is to act as a pivot or shaft. Such an application is illustrated in Fig. 5 where the pin 9 is held tightly within the holes of members 10 and 11, but passes loosely through the hole in member 12. Thus member 12 may pivot about the pin 9 in the manner of a hinge.

It will be apparent that a great number of other embodiments may be devised without departing from the spirit and scope of my invention. For instance, the convolute winding may be made somewhat helical to impart a cone shape to my pin. This will facilitate its insertion, and the normal cylindrical shape can be achieved during the driving of the pin into the hole.

One of the outstanding features of my novel fastening pin lies in the great variety of characteristics that may be imparted thereto. By employing a relatively heavy gauge spring steel sheet that is tightly wound I may form a heavy duty pin that displays very high shear strength, in fact, greater resistance to shearing than a solid pin of the same diameter. At the same time this heavy duty pin possesses considerable ability to absorb shocks and vibrations. For maximum shear strength it is necessary that the sheet be continuous at least where the shear forces are applied. By reducing the thickness of the steel sheet a light duty pin may be formed having a lower shear resistance, but greater ability to absorb shocks and vibrations. Medium and light duty pins may even be driven into the tapered hole where they will assume the shape of the hole and hold fast.

In applications where it is difficult to determine whether shock and vibration forces or shear forces are causing pin failure, my fastening pins can be used as a means of detecting which force is the most critical. Infinite variety in characteristics can be achieved by selection of spring material, thickness of the sheet, number of turns, tightness of the winding, etc. Thus, a suitable pin can be designed for almost any conceivable application, according to the load requirements.

As regards the number of turns in substantial contact, I prefer to use about two. Less than two turns of the spring material, when the pin is in use (contracted), will result in a great loss of shear strength. Furthermore, some of the excellent performance characteristics of my fastening pins appear to be due to friction between adjacent turns. Such effect is lost if substantially less than two turns are employed. I may increase the number of substantially contacting turns, but generally I prefer to use slightly in excess of two complete turns as shown in Figs. 1 to 4 of the drawings in which of the order of two and one-quarter turns are employed. If greater shear strength is desired, I prefer to accomplish this by increasing the thickness of the sheet.

The possible uses for my fastening pins are a legion. They are quite generally useful for all kinds of fastening purposes. A particular field of application lies in the fastening materials, such as wood, that are subject to substantial shrinkage and/or expansion. My fastening pins can accommodate themselves to such dimensional changes owing to their inherent elasticity. They are very suitable for use in connection with plastics and find wide application in the electrical industry where they may be used for instance as electrical contacts.

Throughout this specification I have used the term "pin" in its usual sense, i. e., to describe an object having roughly a cylindrical exterior shape and which is of greater length than its diameter. My fastening pins are thus clearly distinguished from the ordinary coiled springs whose exterior diameters are far greater than their heights.

As many apparently widely different embodiments of this invention may be made without departing from the spirit and scope hereof, it is to be understood that the invention is not limited to the specific embodiments hereof except as defined in the appended claims.

I claim:

1. For use with a pair of machine elements having aligned cylindrical bore formations therein, the improvement comprising a hollow fastening pin adapted to engage one of said bore formations in a driving fit and to be subject to shearing forces in a direction transverse to the longitudinal axis of said pin, the said pin consisting of a rectangular sheet of spring metal of uniform thickness wound upon itself about said axis in surface contact for the order of two and one-quarter turns, with the inner end portion of said sheet defining a central free space and the outer end thereof terminating in a radially extending surface, whereby the fourth quadrant of the outermost turn thereof provides a breathing space between the pin and the wall of the bore formation into which the pin is fitted and upon impact of said forces part of the fourth quadrant of the outer turn flattens inwardly upon the adjacent portion of the inner turn and another part of said outer turn moves progressively into greater area contact with the wall of the bore formations.

2. The invention as claimed in claim 1 in which the sheet is of high carbon steel and at least one end of the pin is tapered to facilitate insertion.

3. The invention as claimed in claim 1 in which the sheet is of copper alloy and at least one end of the pin is tapered to facilitate insertion.

4. The combination comprising a pair of machine elements each having an undeformable bore formation of cylindrical shape and a hollow fastening pin having a longitudinal axis and a driving fit in one of said bore formations, extending into the other bore formation, and subject to high shear and shock forces, said pin comprising a rectangular sheet of spring metal of uniform thickness wound upon itself about said axis in surface contact for the order of two and one-quarter turns, with the inner end portion of said sheet defining a central free space and the outer end thereof terminating in a radially extending surface, whereby the fourth quadrant of the outermost turn thereof provides a breathing space between the pin and the walls of the bore formations and upon shock impact of said forces of the fourth quadrant of the outermost turn flattens inwardly upon the adjacent portion of the inner turn and another part of said outer turn moves progressively into greater area contact with the walls of the bore formations.

References Cited in the file of this patent

UNITED STATES PATENTS

| | | |
|---|---|---|
| 273,385 | Perkins | Mar. 6, 1883 |
| 722,814 | Conroy | Mar. 17, 1903 |
| 825,069 | Peirce | July 3, 1906 |
| 961,249 | Meeker | June 14, 1910 |
| 1,831,163 | Crowell | Nov. 10, 1931 |
| 2,001,257 | Lecler | May 14, 1935 |

FOREIGN PATENTS

| | | |
|---|---|---|
| 744,131 | France | Apr. 12, 1933 |